United States Patent Office 2,820,777
Patented Jan. 21, 1958

2,820,777

PROCESS OF PREPARING POLYACRYLAMIDE

Tzeng Jiueq Suen and Arthur M. Schiller, New Canaan, Conn., assignors to American Cyanamid Company, New York, N. Y., a corporation of Maine No Drawing. Application April 29, 1954
Serial No. 426,567

8 Claims. (Cl. 260—89.7)

This invention relates to a continuous process for the polymerization and hydrolysis of acrylamide and its alkyl alpha-substituted derivatives wherein the alkyl group contains from 1 to 2 carbon atoms. More particularly this invention relates to the continuous polymerization and hydrolysis of acrylamide to form a polymeric material containing amide and carboxylate groupings. Further, this invention relates to the polymeric compositions produced, their method of production and articles produced therefrom.

Polymeric compositions containing amide and carboxylate groups are known and find employment among other things as additives to paper for improving the dry strength, as coating materials and as sizing materials. This type of polymer may be prepared by copolymerizing acrylamide and acrylic acid, either with or without neutralization of the reaction product. In such a process two monomeric compounds are required. It is also known that similar polymeric compositions may be prepared by a controlled hydrolysis of polyacrylamide. However, such a process requires two procedural steps. We have now found that acrylamide may be polymerized and hydrolyzed in a single continuous operation whereby both degree of polymerization and degree of hydrolysis can be closely controlled.

It is an object of our invention to polymerize and hydrolyze acrylamide in a single-step continuous operation. It is a further object of our invention to prepare polymeric compounds containing both amide and carboxylate groupings. These and other objects of our invention will be discussed more fully hereinbelow.

By the process of our invention, polymeric materials are produced containing both amide

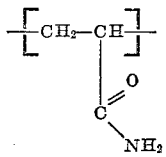

and carboxylate groupings

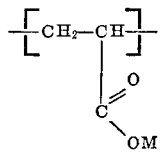

wherein M is an alkali metal or hydrogen. In order to carefully control the degree of polymerization and degree of hydrolysis in the process, several factors must be considered. It is known that, as the reaction temperature decreases, the degree of polymerization increases. On the other hand, as the reaction temperature is increased, the degree of hydrolysis increases. It is therefore required that a control of the temperature during the continuous polymerization and hydrolysis of acrylamide be observed for obtaining a desirable product. Another factor that must be considered in order to obtain controlled yields is the residence time of the reactants in the reaction zone. While increasing the residence time of the reactants in the reaction zone increases the degree of hydrolysis obtained, an increased residence time lowers the degree of polymerization that takes place. Factors among others that must also be considered are catalyst concentration and the concentration of chain transfer agents if present. We have found that continuous polymerization and hydrolysis of acrylamide may be carried out within the temperature range of from about 50° C. to about 100° C., preferably within the range of from about 60° C. to about 90° C.

Residence time of the reactants in the reaction zone should also be controlled for optimum results. Residence time is defined as the working capacity of the reactor divided by the rate of flow of all the material through the reactor. For example, if a reactor is of C gallons capacity and the pumping rate of all of the material through the reactor is ½ C gallons per hour, the residence time then is 2 hours. We have found that the residence time of the reactants may vary from as little as 10 minutes to as much as 5 hours. However, it is preferred that the residence time be within the order of from about 20 minutes to about 3 hours. Obviously, economic considerations warrant reduced residence time in the reaction zone.

The continuous polymerization and hydrolysis of acrylamide and its alkyl alpha-substituted derivatives wherein the alkyl group contains from 1 to 2 carbon atoms is carried out in an aqueous medium in the presence of a polymerization catalyst and an alkali metal hydroxide. Not only may acrylamide be continuously polymerized and hydrolyzed by our invention but also acrylamide derivatives such as methacrylamide, ethacrylamide and the like may be employed where the alkyl derivative contained from 1 to 2 carbon atoms. The alkali metal hydroxides employed in our invention are such as lithium hydroxide, sodium hydroxide, potassium hydroxide and the like. It is necessary that the molar ratio of the alkali metal hydroxide to the acrylamide or its alkyl alpha-substituted derivatives be controlled during the continuous polymerization and hydrolysis. From about 0.25:1 to about 0.01:1 mol of alkali metal hydroxide should be present per mol of acrylamide or its alkyl alpha-substituted derivative during the process. The preferred mol ratio of alkali metal hydroxide to acrylamide or its alkyl alpha-substituted derivatives is from about 0.15:1 to about 0.03:1, respectively. No pH of the reaction mixture is required during the process and, in view of the presence of the alkali metal hydroxide, it is apparent that the pH of the reaction will be alkaline.

In order that those skilled in the art may more fully understand the inventive concept herein presented, the following examples are given by way of illustration and not limitation unless noted in the appended claims. All parts are parts by weight.

Example 1

Solution A:
  5480 parts acrylamide
  4030 parts water
Solution B:
  73.1 parts potassium persulfate
  396 parts sodium hydroxide
  8823 parts water Solutions A and B were pumped separately and continuously into a reactor fitted with an overflow outlet, a thermometer, an inert gas inlet, feed inlets and reflux condenser. The two streams were pumped at an equal volume rate and at such a rate that one hour was required to pump a total volume equal to the working capacity of the reactor. The reactor temperature was maintained at 80° C. Nitrogen gas was bubbled through the reactor to maintain an inert atmosphere. The product was collected after a steady state had been established.

The product was a clear solution with a viscosity of about 1400 centipoises at 25° C. Analytical data indicated that the polymer contains about 14 mol percent carboxyl groups.

Paper handsheets were prepared by adding various amounts of the product to the pulp along with 3% alum. The following table shows the evaluation results:

|  | Dry tensile,[1] lbs./in. | Burst,[1] lbs./sq. in. |
| --- | --- | --- |
| 0% resin plus 3% alum | 21.5 | 40.0 |
| 0.25% resin plus 3% alum | 27.0 | 57.5 |
| 1.0% resin plus 3% alum | 28.0 | 60.5 |

[1] Results corrected to basis weight of 48.5 lbs.

*Example 2*

Example 1 was repeated with the following solutions:

Solution A:
 5480 parts acrylamide
 3664 parts water
 220 parts isopropyl alcohol Solution B:
 18.3 parts potassium persulfate
 396 parts sodium hydroxide
 8878 parts water The product obtained had a viscosity of about 1100 centipoises at 25° C.

*Example 3*

Example 1 was repeated with the following solutions:

Solution A:
 5480 parts acrylamide
 4030 parts water

Solution B:
 16.4 parts potassium persulfate
 94 parts sodium hydroxide
 8942 parts water The product obtained had a viscosity of 88,700 centipoises at 25° C.

*Example 4*

Example 3 was repeated except that methacrylamide was substituted for acrylamide. The product obtained had a viscosity of 7900 centipoises at 25° C.

The polymeric composition prepared by the process may have a molecular weight varying from about 5000 up to as high as 2,000,000 or more. The desired degree of polymerization or molecular weight of the product depends on the ultimate use of the polymeric material. The polymers produced possess a minimum of 3 mol percent hydrolysis products. By employing the maximum amount of alkali metal hydroxide as specified above, it is possible to obtain a maximum hydrolysis of about 30 mol percent in the polymeric material. The amount of water present during the continuous polymerization and hydrolysis of the acrylamide is not critical. Obviously, a certain amount of water must be present in order to obtain a hydrolyzed product. On the other extreme, a large excess of water does not materially affect the reaction and merely tends to present mechanical problems, e. g., reaction zone capacity tends to limit the maximum amount of water employed. Determinations of such factors as molecular weight of the polymeric material, desired solids content of the final product among others will determine the amount of water present during the reaction period.

Any suitable means may be employed in effecting the continuous polymerization of the acrylamide during the continuous polymerization and hydrolysis thereof. Heat, light or both heat and light with or without polymerization catalyst can be used. Ultraviolet light is more effective than ordinary light. It is also possible to effect polymerization as a result of gamma radiation as from cobalt 60, radium or other radio active materials. A polymerization catalyst is preferably employed in order to shorten the period of time required for polymerization of the acrylamide. Any of the polymerization catalysts which are suitable for use in polymerizing compounds containing an ethylenically unsaturated grouping, specifically a vinyl grouping, can be used. The catalyst may be used alone or as a redox (reduction-oxidation) system with a water-soluble activator therefor. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tertiary-butyl) peroxide and di-(tertiary-amyl) peroxide, such peroxides often being designated as ethyl, propyl, lauryl, oleyl, stearyl, tertiary-butyl and tertiary-amyl peroxides; the alkyl hydrogen peroxides, e. g., tertiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide catalysts that can be employed are the following: tetralin hydroperoxide, tertiary-butyl diperphthalate, cumene hydroperoxide, tertiary-butyl perbenzoate, 2,4-dichlorobenzoyl peroxide, urea peroxide, caprylyl peroxide, p-chlorobenzoyl peroxide, 2,2-bis (tertiary-butyl peroxy) butane, hydroxyheptyl peroxide and diperoxide of benzaldehyde. Other so-called "free radical" types of catalysts, e. g., a,a'-azodiisobutyronitrile, also can be used to accelerate polymerization.

Illustrative examples of water-soluble activators (water-soluble polymerization adjuvants) of the catalyst are oxygen-containing sulfur compounds which are capable of undergoing oxidation, for instance, sulfur dioxide, the alkali metal (e. g., sodium, potassium, etc.) bisulfites, hydrosulfites, thiosulfates, sulfurous acid (or compounds which engender sulfurous acid, e. g., alkali metal sulfites, ethyl and other alkyl sulfites, etc.), various organic sufinic acids, e. g., p-toluene sulfinic acid, formamidine sulfinic acid, etc.

The amount of catalyst used may be varied widely depending, for example, upon the particular kind of catalyst used and other polymerization conditions, and may range, for instance, from about 0.1% to about 5% or even as high as 10% or more by weight of the total amount of the acrylamide or its derivative employed. Generally, the amount of catalyst is within the range of about 0.1% to about 3% or 4% by weight of the total monomers. The amount of polymerization adjuvant or activator used likewise may be varied considerably but generally is within the range of from about 0.1 to 1 molar proportion, based on the catalyst used or an amount which is chemically equivalent to the amount of catalyst employed. The use of higher ratios of activator with respect to the catalyst is not precluded, e. g., 2 or 3 or more mols of activator per mol of catalyst, or correspondingly larger proportions on a chemically equivalent basis, but no particular advantages ordinarily accrue therefrom.

The polymerization reaction may be effected, if desired, while the aqueous medium is maintained under an atmosphere of an inert gas, for example, nitrogen, helium, carbon dioxide, etc.; or, it may be carried out under an atmosphere of air.

Modifying or chain transfer agents may also be present in the reaction mixture during the continuous polymerization and hydrolysis of the acrylamide or its alkyl alpha-substituted derivative. When such an agent is present, it is preferably kept within the range of from about 0.1% to about 100% by weight, based on the total weight of the monomeric materials present. Such compounds as water-soluble alcohols, e. g., methyl alcohol, ethyl alcohol, isopropyl alcohol and the like; mercaptans and their derivatives, e. g., thioglycol, thioglycolic acid, methylthioglycolate and the like, may be used.

In certain instances it may be desirable to incorporate other monomeric materials into the reaction zone in order to form copolymers with the acrylamide or its derivative. In the event that other molecular materials are copolymerized with the acrylamide, it is necessary that the amount utilized be such that the water-soluble characteristics of the continuously polymerized and hydrolyzed acrylamide not be destroyed. Examples of monomeric materials that may be used herein are such as styrene, acrylonitrile, methylacrylate, methylmethacrylate, vinylacetate and the like.

The polymeric material prepared in accordance with our invention is a clear infinitely water-soluble compound exhibiting typical polyelectrolyte behavior. The polymeric composition may be used to modify cement, drilling mud and the like. The polymeric composition may also be cross-linked with polyvalent metallic ions as is well known in the art.

What is claimed is:

1. A continuous process for the polymerization and hydrolysis of acrylamide and its alkyl alpha-substituted derivatives wherein the alkyl group contains from 1 to 2 carbon atoms which comprises reacting in an aqueous medium and at a temperature within the range of from about 50° C. to about 100° C. said acrylamide in the presence of a polymerization catalyst and of an alkali metal hydroxide wherein said hydroxide is present in an amount varying between about 0.01:1 to about 0.25:1 mols per mol of said acrylamide.

2. A continuous process for the polymerization and hydrolysis of acrylamide and its alkyl alpha-substituted derivatives wherein the alkyl group contains from 1 to 2 carbon atoms which comprises reacting in an aqueous medium and at a temperature within the range of from about 60° C. to about 90° C. said acrylamide in the presence of a polymerization catalyst and of an alkali metal hydroxide wherein said hydroxide is present in an amount varying between about 0.03:1 to about 0.15:1 mols per mol of said acrylamide.

3. A continuous process for the polymerization and hydrolysis of acrylamide which comprises reacting in an aqueous medium and at a temperature within the range of from about 50° C. to about 100° C. said acrylamide in the presence of a polymerization catalyst and of an alkali metal hydroxide wherein said hydroxide is present in an amount varying between about 0.01:1 to about 0.25:1 mols per mol of said acrylamide.

4. A continuous process for the polymerization and hydrolysis of acrylamide which comprises reacting in an aqueous medium and at a temperature within the range of from about 60° C. to about 90° C. said acrylamide in the presence of a polymerization catalyst and of an alkali metal hydroxide wherein said hydroxide is present in an amount varying between about 0.03:1 to about 0.15:1 mols per mol of said acrylamide.

5. A continuous process for the polymerization and hydrolysis of methacrylamide which comprises reacting in an aqueous medium and at a temperature within the range of from about 50° C. to about 100° C. said acrylamide in the presence of a polymerization catalyst and of an alkali metal hydroxide wherein said hydroxide is present in an amount varying between about 0.01:1 to about 0.25:1 mols per mol of said acrylamide.

6. A continuous process for the polymerization and hydrolysis of methacrylamide which comprises reacting in an aqueous medium and at a temperature within the range of from about 60° C. to about 90° C. said acrylamide in the presence of a polymerization catalyst and of an alkali metal hydroxide wherein said hydroxide is present in an amount varying between about 0.03:1 to about 0.15:1 mols per mol of said acrylamide.

7. A continuous process for the polymerization and hydrolysis of acrylamide and its alkyl alpha-substituted derivatives wherein the alkyl group contains from 1 to 2 carbon atoms which comprises reacting said acrylamide in an aqueous medium and at a temperature within the range of from about 50° C. to about 100° C. in the presence of an alkali metal hydroxide wherein said hydroxide is present in an amount varying between about 0.01:1 to about 0.25:1 mols per mol of said acrylamide.

8. A continuous process for the polymerization and hydrolysis of acrylamide and its alkyl alpha-substituted derivatives wherein the alkyl group contains from 1 to 2 carbon atoms which comprises reacting said acrylamide in an aqueous medium and at a temperature within the range of from about 50° C. to about 100° C. under catalytic conditions and in the presence of an alkali metal hydroxide wherein said hydroxide is present in an amount varying between about 0.03:1 to about 0.15:1 mols per mol of said acrylamide.

References Cited in the file of this patent

UNITED STATES PATENTS

| 2,120,933 | Dittmar | June 14, 1938 |
| 2,476,527 | Barnes | July 19, 1949 |

FOREIGN PATENTS

| 956,590 | France | Aug. 15, 1949 |

OTHER REFERENCES

Arcus: Journal of the Chemical Soc. (London), November 1949, pages 2732 to 2736.

U. S. DEPARTMENT OF COMMERCE
PATENT OFFICE

CERTIFICATE OF CORRECTION

Patent No. 2,820,777                                   January 21, 1958

Tzeng Jiueq Suen et al.

It is hereby certified that error appears in the printed specification of the above numbered patent requiring correction and that the said Letters Patent should read as corrected below.

Column 2, line 48, after "pH" insert --control--.

Signed and sealed this 25th day of March 1958.

(SEAL)
Attest:
KARL H. AXLINE

Attesting Officer

ROBERT C. WATSON
Commissioner of Patents